Figure 1:
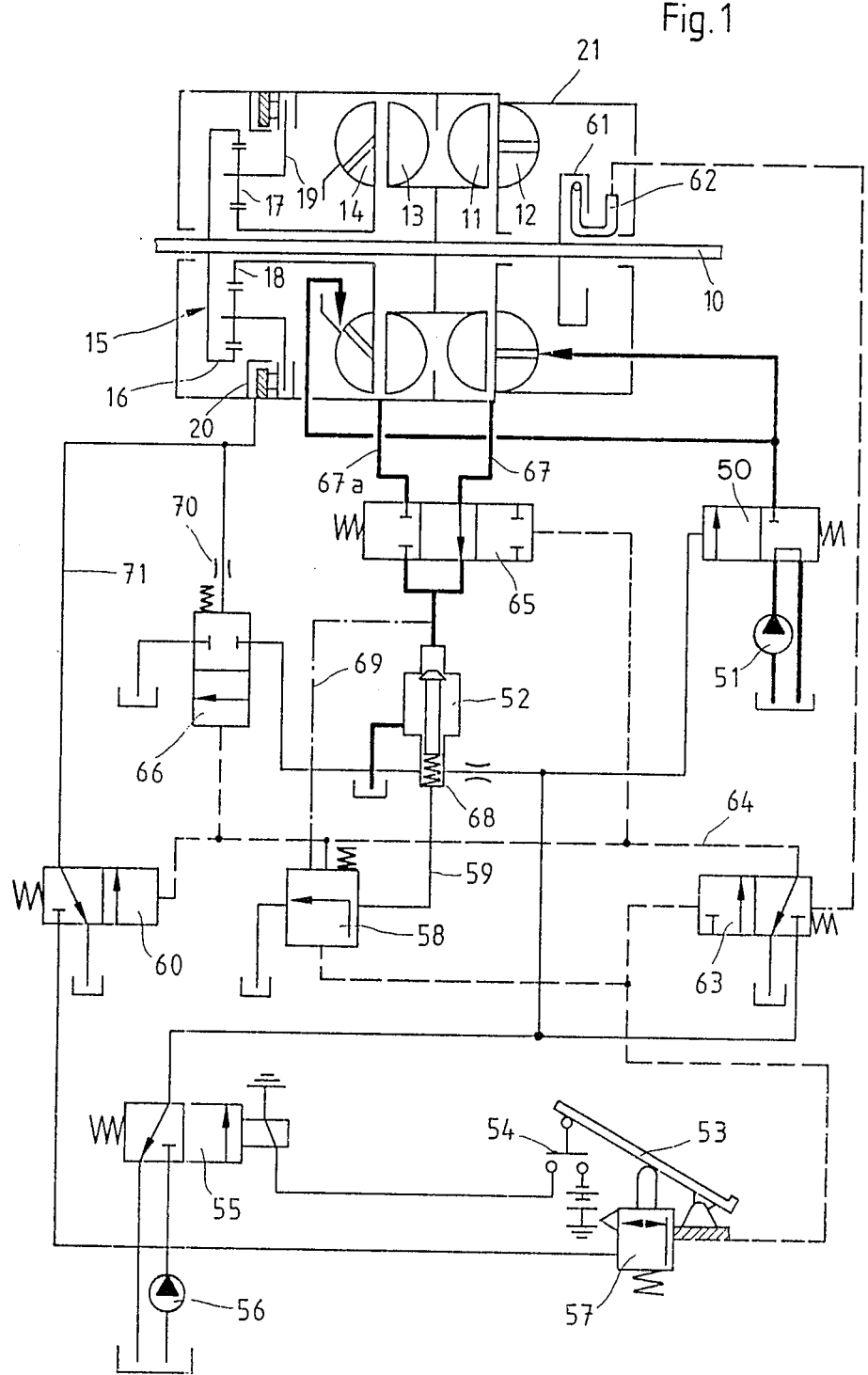

United States Patent [19]

Brosius

[11] Patent Number: 4,715,481
[45] Date of Patent: Dec. 29, 1987

[54] HYDRODYNAMIC RETARDER

[75] Inventor: Klaus Brosius, Heidenheim, Fed. Rep. of Germany

[73] Assignee: J. M. Voith GmbH, Heidenheim, Fed. Rep. of Germany

[21] Appl. No.: 839,335

[22] Filed: Mar. 13, 1986

[30] Foreign Application Priority Data

Mar. 30, 1985 [DE] Fed. Rep. of Germany ....... 3511795

[51] Int. Cl.$^4$ ...................... F16D 57/02; F16D 33/00; F16M 3/44
[52] U.S. Cl. .................................... 188/291; 60/336; 74/791; 188/294
[58] Field of Search ............... 188/290, 291, 292, 293, 188/294, 295, 296; 192/61; 74/790, 791; 303/3, 11; 60/330, 336, 357

[56] References Cited

U.S. PATENT DOCUMENTS 3,463,281  8/1969  Aschauer ...................... 188/290 X
4,343,383  8/1982  Brosius et al. ..................... 188/296

FOREIGN PATENT DOCUMENTS 1480318  7/1969  Fed. Rep. of Germany .
1630801  3/1971  Fed. Rep. of Germany ...... 188/291
3105004  9/1982  Fed. Rep. of Germany .
3229951  2/1984  Fed. Rep. of Germany ...... 188/290

Primary Examiner—Andres Kashnikow
Assistant Examiner—Robert J. Oberleitner
Attorney, Agent, or Firm—Jeffers, Hoffman & Niewyk

[57] ABSTRACT

The invention relates to a hydrodynamic retarder having two independent operating circuits. Opposite a double rotor on the one hand is a stator fixed to a housing, and the rows of vanes concerned are inclined. The other half of the rotor forms with a rotatable stator and a second operating circuit having rows of blades equally effective in both rotational directions. The stator of this second operating circuit can be coupled via a gear unit and a coupling device to the retarder shaft. The gear unit drives the stator in a direction opposite to the direction of rotation of the rotor and with step-up transmission. When braking from a high travelling speed, only the first operating circuit is effective, the stator of the second operating circuit is released by the retarder shaft and freely rotates as well without any braking action. As the speed drops, the coupling device is actuated and the stator of the second operating circuit is driven in the opposite direction, during which the second operating circuit is temporarily emptied. The advantage of this arrangement is high braking force at high speeds of travel, associated with high braking force in the low speed range right down to approx. zero and in both directions of travel, also the retarder does not need to be attached to the gear shift and does not need to feed power in by a driving engine.

13 Claims, 4 Drawing Figures

HYDRODYNAMIC RETARDER

The invention relates to a hydrodynamic retarder, preferably for installation in vehicles of the kind having two independent operating circuits comprising: a first toroidal operating circuit formed from a row of rotor blades connected to a retarder shaft and from a stationary row of stator blades; and a second toroidal operating circuit formed from a second row of rotor blades connected to the retarder shaft and a pivoted second row of stator blades.

Such a retarder is known from DE-PS No. 31 05 004. This consists of a rotor having two rows of blades, which is connected to a transmission power take-off shaft. One of the rows of blades forms a first toroidal working chamber with a stationary row of stator blades, and the other row of rotor blades forms a second toroidal working chamber with a further row of vane wheels, which is however pivoted and is moved by the driving engine and rotates in the opposite direction to the rotor.

The braking operation from a high travelling speed is chiefly effected by the first retarder circuit provided with a fixed stator down to the speed at which the braking moment decreases along the parabolic limiting curve. In this operating range the second retarder circuit can also be operative by filling. However, when the braking moment of the first retarder circuit drops, the second retarder circuit develops a rising braking moment, with a regulating device being responsible for observing a theoretical value for the braking force by the adjustable filling of the second retarder circuit. When the vehicle is stationary, the braking moment of the second retarder circuit reaches its maximum by the driving engine transmitting a static torque by means of the oppositely directed row of blades to the associated rotor with the help of the driving engine.

This braking behaviour is advantageous for certain applications in which particularly large braking forces are required, particularly at speeds close to zero. However, here the fact that the driving engine has to feed power into the retarder during braking is disadvantageous. Furthermore it is absolutely necessary to have a coupling of the retarder circuits to a gear shift, which must moreover be of a preferred design so that the attachment to and drive of the retarder can be favourably arranged. Moreover a separate reversing gear is required for the retarder in the gear shift if the retarder is also to have the same properties during reverse motion, or an additional hydraulic circuit is required for reverse motion. It is not possible to have separate installation in a vehicle. Therefore economic considerations prohibit the use of this retarder design in many other vehicles.

The object of the invention is to give a retarder which does not need to be built on to a gear shift and is independent of the power supply owing to a driving engine, and in which, moreover, only forces of inertia are effective on switching on, and which operates smoothly right down to low speeds without interrupting the braking force and which, in the lower speed range, can also develop braking moment in the direction opposite to the direction of rotation.

This object has already been solved by means of other types of hydraulic brakes. From DE-AS No. 1 480 318 is known a retarder circuit which has a single toroidal operating circuit. The author of this document has recognised that the reduction of the braking force below a certain speed can be compensated for in that the stationary row of vane wheels previously operating as a stator is made to rotate in the direction opposite to the rotor. There it was suggested bringing into effect a reversing gear between the power take-off shaft and the row of stator blades during the braking operation. Moreover, when braking from a high rotational speed the stator is primarily arrested via a friction brake constructed as a band brake. The locking brake is to be released if the rotational speed assigned to the maximum braking moment is fallen short of, and simultaneously a reversing gear is to make the stator rotate in the opposite direction. In practice this reversal involves a jerky change in the braking force, which is not acceptable for a bus, for example. In addition all the elements of the reverse gear and other switching appliances involved in the transmission path have to contribute to the maximum torque of the stator including all forces of inertia.

In practice this means abrasion, high incidence of heat and large dimensions. During a switching operation it is either only possible to brake in reverse gear with the braking force being interrupted or very large torques must be overcome. In accordance with the prior art, only upright vanes achieve the same good braking effect in both rotational directions. The known retarder therefore either develops much too little braking force in the upper speed range, or it can not be used to the same good effect for both rotational directions. The retarder does not appear to be suitable for practical use in vehicles.

In contrast, the present invention solves the above-noted object and provides a retarder equipped with two operating circuits constructed as follows: The first operating circuit essentially has a known design with a non-rotatable stator fixed to a housing. Both the rotor for the first and the rotor for the second operating circuit are disposed on the retarder shaft. The stator for the second operating circuit is rotatable and is connected to the retarder shaft via a step-up reversing gear and a releasable coupling device, so that a rotary movement in the opposite direction occurs between the rotor and stator of the second operating circuit with a substantial difference in the rotational speed. The rows of blades for the first operating circuit have blades slanting towards the axis of rotation of the rotor. The rows of blades for the second operating circuit are provided with blades which are equally effective in both rotational directions.

With this arrangement the following mode of operation is achieved: For braking from high travelling speeds the first operating circuit is filled by the braking command, and its braking moment is adjusted to a desired value by a regulating device. Moreover the coupling device between the retarder shaft and the stator of the second operating circuit has not yet been actuated. In addition, the second operating circuit is generally filled with a mixture of air and liquid, by means of which the stator also rotates empty without producing a braking moment.

As soon as the first operating circuit is completely full and has therefore reached its limiting output, the coupling device for the stator of the second operating circuit is actuated, and the stator is thus made to rotate at a high speed in the opposite direction to the rotor. During the switching on operation for the coupling device, a relief valve in the hydraulic circuit ensures by lowering the pressure that any increase in pressure or partial filling occuring in the second operating circuit is reversed. After the actuation of the coupling device, the filling of the second operating circuit is commenced. Both operating circuits are now in operation, and the braking moment of the first operating circuit decreases as the speed decreases in accordance with the limiting parabola. The braking moment of the second operating circuit is adjusted by a regulating device, preferably by the jointly used regulation appliance already mentioned, so that the jointly developed braking moment corresponds to the desired value.

In contrast to know retarders, the following advantages result from this: The energy required to maintain the counter-rotation of the blade wheels in the second operating circuit comes from the retarder shaft, i.e. from the kinetic energy of the vehicle to be braked. No injection of power is required for this from a driving engine. The switching on of the stator in the second operating circuit does not occur under load and only while the first operating circuit is still in operation. The coupling device only has to bring the mass of the stator rotating emply via the reversing gear to the corresponding rotational speed. This enables the reversing gear and the coupling device to be dimensioned in a space-saving manner, as no notable abrasion or development of heat occurs. As a regulating device ensures that both operating circuits do not jointly exceed the desired value of the braking force, the switching on of the second operating circuit proceeds smoothly.

Furthermore it is essential to the invention that the first operating circuit produces a sufficiently high braking moment up to its limiting output on account of its slanting blades. Only for the lower speed range is the second operating circuit switched on, and its weaker braking force resulting from the differently arranged blades is increased by the reversing gear being stepped up. In this way it is possible to brake right down to a very low speed, with the result that only a very small amount of kinetic energy has to be dissipated via the vehicle friction brake. However, the main advantage of the retarder is that, in the lower speed range involved in reverse motion, it is equally suitable for use in both directions of travel and it complies with the legal requirements for the third brake.

It goes without saying that known measures are taken to avoid air ventilation losses in the disconnected condition (e.g. sliding diaphragms or the like). Such measures are not necessary for the second operating circuit. In the disconnected condition the coupling device is released, the stator can freely rotate and is entrained via the rotor in the rotational direction of the rotor as with a hydronamic coupling with little slip and ventilation losses.

The reversing gear can be designed as an epicyclic gear, in which the planet carrier is stationary during the operation of the second operating circuit, the annular gear wheel being driven by the retarder shaft and the stator being driven by the sun wheel. Moreover it is advantageous to construct the coupling device for the stator as a locking brake for the planet carrier, which only has to delay or accelerate the masses of the planet carrier and stator when operated. Another embodiment provides the annular gear wheel connected via a rotating coupling to the retarder shaft. In this case the amount of mass for the coupling is higher during gear change, and the actuating device requires more input that for a brake having a half fixed to a housing.

Figure 2:
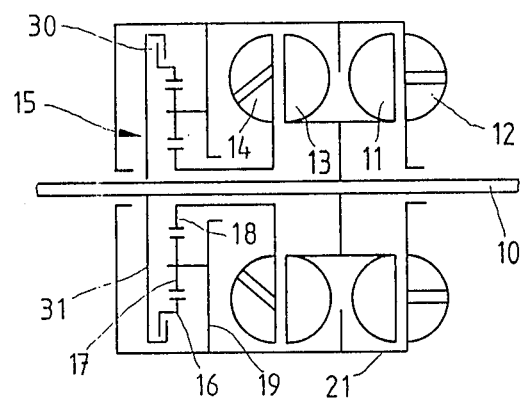
Figure 3:
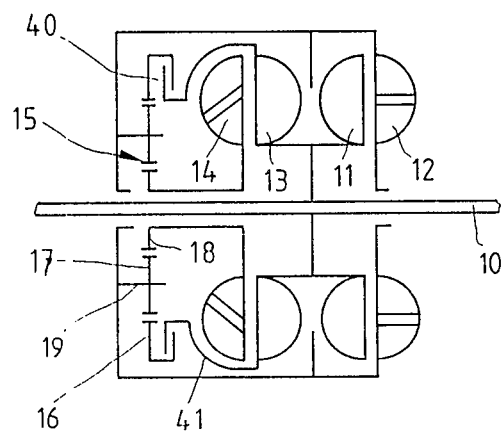

One exemplified embodiment of the invention is described in more detail by drawings. They show:

FIG. 1 a hydrodynamic retarder having an associated regulating device;

FIGS. 2 and 3 further embodiments of the invention

Figure 4:
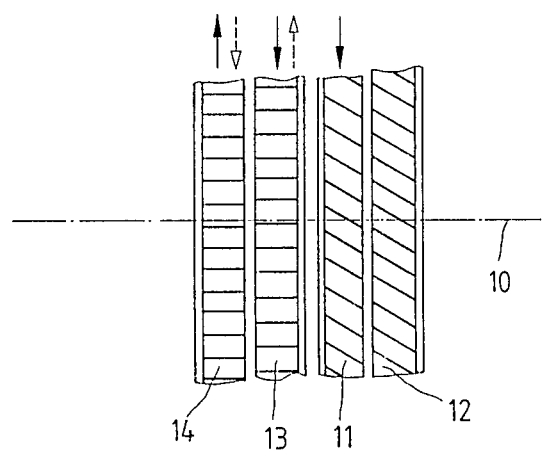

FIG. 4 a diagrammatic representation of the arrangement of the rows of blades.

In all figures identical parts are given the same reference numbers.

In FIG. 1 a retarder shaft is designated by 10, on which a first row 11 of rotor blades is disposed, which forms a first operating circuit with a row of stator blades 12 fixed to a housing 21. A second row 13 of rotor blades, which forms one component together with the first, preferably with their backs touching, is opposite a pivoted row 14 of stator blades, from which a second operating circuit results. Inside a common housing 21 is disposed an epicyclic gear 15, which consists of an annular gear wheel 16 connected to the retarder shaft 10, a planet carrier 19 having planet wheels 17 and a sun wheel 18. Epicyclic gear 15 may have a step-up ratio range between 1.2 and 5.0. The stator 14 is rotatably connected to the sun wheel 18. The planet carrier 19 can be arrested by means of a brake 20 disposed on the housing 21, and this brake can be a multiple-plate or disk brake. This results in a reversal of the direction of rotation and simultaneously brings about an increase in the rotational speed between the annular gear wheel and the sun wheel.

The retarder can be operated by a control and regulating device essentially corresponding to that in DE-OS No. 31 05 004. However, in contrast to this, FIG. 1 shows a control device which, as a simplification, only has a single device for regulating the degree of admission for both operating circuits. The retarder is filled via a starting valve 50, which supplies the flow of oil transported by a pump 51 to the two operating circuits as known. In the present exemplified embodiment, moreover, both operating circuits are constantly and simultaneously supplied with fluid. Behind the exit from the retarder is an overflow valve 52, into which the flow of oil from both operating circuits opens through lines 67 and 67a. The braking command comes from a brake pedal 53, which has two functions, namely firstly switching on the brake via a pair of contacts 54 and a solenoid valve 55, which passes on the pressure of a control pump 56 to the starting valve 50. Secondly the brake pedal actuates a precision adjustment valve 57, which converts pressure also coming from the control pump 56 into a desired value for a regulating valve 58 and an auxiliary control valve 63. The control pump 56, moreover, supplies the pressure oil for the brake 20, controlled by a starting valve 60. The pumps 51 and 56 are driven by the retarder shaft 10.

Firstly when there is a braking command via the starting valve 50, both operating circuits are jointly filled, and first circuit 11 is emptied via overflow valve 52, which is controlled by regulating valve 58 via connecting line 59. Overflow valve 52 and regulating valve 58 cooperate to provide a superposed joint regulating device. In this operating condition the second operating circuit 13, 14 does not yet perform any braking action because the brake 20 has not yet been acted upon and the stator 14 freely rotates with the rotor 11, 13. A scoop pipe chamber 61 rotating with the retarder shaft, in which there is a ring of fluid, generates pressure quadratically proportional to the rotational speed of the retarder via a submerged, fixed scoop pipe 62. This pressure is conveyed, as known, to an auxiliary control valve 63 and, as a result, at a high rotational speed this valve remains in the position of rest shown despite the counter-effective desired value pressure of the brake pedal 53 or the precision adjustment valve 57 respectively. If the rotational speed of the retarder drops, the desired value pressure weighs down on the auxiliary control valve 63 from a certain rotational speed corresponding to the attainment of the completely full parabola of the first operating circuit. This goes into its operating position and clears the way for a build-up of the pressure in the line 64. The pressure originating from the control pump 56 is now conveyed to the regulating valve 58, but also simultaneously to a change-over valve 65 between the outlet from the operating circuits and the overflow valve 52. This change-over valve 65 is closed so that from now on the first operating circuit is completely closed and remains in action. Simultaneously the starting of the second operating circuit is initiated.

For this purpose the pressure from the line 64 is also transmitted to the starting valve 60 for the brake 20. This is moved into its operating position, so that the actuating device for the brake is impinged by the line 71 and a torque is thereby required of the stator 14. So as to keep the mechanical load of the gear 15 and the brake 20 as low as possible, the second operating circuit is at least partially emptied during this switching operation. If the brake 20 were closed, provided that the second operating circuit is still filled, the brake would firstly have to retard the stator 14 from the instantaneous direction of rotation and again accelerate against the hydraulic braking moment in the reverse direction, which would result in a considerable loading of the switching elements involved. The second operating circuit is emptied via the change-over valve 65 and by the load on the ante-chamber 68 of the overflow valve 52 being relieved. This occurs via a change-over valve 66 actuated simultaneously with the valve 60 and occurs so quickly that just a temporary drop in pressure by emptying the outlet line 67 into a pressureless oil tank prevents the build-up of a torque between the rotor 13 and the stator 14. For this purpose the change-over valve 66 has a double-action actuating cylinder. At the same time the pressure conveyed from the auxiliary control valve 63 through the line 64 acts on a piston surface, so that the change-over valve 66 is displaced into the operating position, in which the temporary emptying of the second operating circuit occurs. A second impingement of the change-over valve 66 by means of the pressure in the line 71 to the brake 20 is provided via a throttle 70, so that the change-over valve 66 again neutralises the easing of the load of the ante-chamber 68 of the overflow valve 52 at the latest when the brake 20 is impinged with sufficiently high pressure. In this operating condition the second operating circuit is switched on.

The braking moment is controlled via the line 69 from the two operating circuits to the regulating valve 58, which, as known, is impinged by the brake pedal 53 with a desired value.

FIG. 2 diagrammatically shows another embodiment of a retarder in accordance with the invention. The retarder shaft 10 and the stator 14 are rotationally connected by a rotary coupling 30 between the annular gear wheel 16 and a component 31 constructed like a disk or flange on the retarder shaft. In this case the epicyclic reversing gear 15 is a constant ratio gear with a planet carrier 19 fixed to a housing and the planets 17 are reversing wheels between the annular gear wheel 16 and the sun wheel 18. The coupling 30 has to be actuated by rotating parts.

FIG. 3 shows a deviation from the type of construction shown in FIG. 2. In principle the gear kinematics are the same, but the annular gear wheel 16 can be coupled via a coupling 40 to the rotor 13 disposed on the retarder shaft 10. As a result a separate flange-like component 31 as shown in FIG. 2 can be dispensed with, but instead another solution has to be found for emptying the second operating circuit, because the rotor 13 embraces the stator 14 with a shell-shaped connection piece 41.

FIG. 4 diagramatically shows in a cylindrical section the rows of blades of rotors 11, 13 and stators 12, 14. The slanting blades of the first operating circuit 11, 12 can introduce a large braking moment at high travelling speed, but only in one direction of travel. On the other hand the second operating circuit is provided with blades symmetric to the axis of rotation, and in the simplest case with upright blades, so that even in reverse motion in the lower speed range a braking moment equivalent to forward motion is achieved.

I claim:

1. A hydrodynamic retarder, having two independent operating circuits in a common housing comprising:
  (a) a first toroidal operating circuit formed from a first row of rotor blades connected to a retarder shaft and from a stationary row of stator blades; and
  (b) a second toroidal operating circuit formed from a second rotor with a second row of rotor blades connected to the retarder shaft and a rotatable stator with a pivoted second row of stator blades wherein the improvement comprises:
  (c) the rotatable stator of the second operating circuit is connected to the retarder shaft via a reversing gear unit which drives the rotatable stator in the opposite rotational direction to that of said first row of rotor blades;
  (d) the reversing gear has step-up gearing for the rotatable stator;
  (e) the reversing gear is provided with a coupling device mounted on said housing, said coupling device providing a releasable connection between the rotatable stator and the retarder shaft;
  (f) the rows of blades of the first operating circuit are inclined towards the axis of rotation of the second rotor, and the rows of blades of the second operating circuit are substantially symmetrical to the axis of rotation of the first rotor; and
  (g) a valve device to activate the second operating circuit, which valve device is provided to lower the pressure limit of an overflow valve with which the second operating circuit can be temporarily emptied throughout the duration of a switching on operation in the coupling device between the retarder shaft and the second stator.

2. A hydrodynamic retarder according to claim 1, where the reversing gear for the rotatable stator of the second operating circuit is constructed as an epicyclic gear with a sun wheel, an annular gear wheel and a planet carrier.

3. A hydrodynamic retarder according to claim 2 wherein the annular gear wheel of the epicyclic gear is connected to the retarder shaft and the rotatable stator is connected to the sun wheel.

4. A hydrodynamic retarder according to claims 2 or 3 wherein the coupling device is constructed as a multiple-plate friction brake, via which the planet carrier of the epicyclic gear unit can be retarded.

5. A hydrodynamic retarder according to claims 2 or 3, wherein the coupling device is constructed as a multiple-plate friction coupling between the annular gear wheel and an element rotating with the retarder shaft.

6. A hydrodynamic retarder according to claims 2 or 3, wherein the step-up of the reversing gear is between 1.2 and 5.

7. A hydrodynamic retarder according to claim 1, wherein a superposed joint regulating device is provided which adjusts the braking moment jointly produced by the two operating circuits to a desired value.

8. A hydrodynamic retarder according to claim 1 wherein both operating circuits can be filled simultaneously when the retarder is switched on.

9. A hydrodynamic retarder according to claim 8, wherein the operating fluid for both operating circuits is supplied via a joint starting valve and the operating fluid is returned via a joint change-over valve and a joint regulating device consisting of an overflow valve and a control valve.

10. A hydrodynamic retarder according to claim 9, wherein the change-over valve has two switching positions, with the following functions:
(a) in a first switching position said change-over valve connects the return line of the first operating circuit to the overflow valve and closes the return line of the second operating circuit, thus activating only the first operating circuit; and,
(b) in a second switching position said change-over valve connects the return line of the second operating circuit to the overflow valve and closes the return line of the first operating circuit, to thus activate both operating circuits.

11. A hydrodynamic retarder according to claim 9, wherein a valve is provided, which is actuated simultaneously with the change-over valve and in its operating position connects an ante-chamber of the overflow valve to a pressureless chamber.

12. A hydrodynamic retarder according to claim 11 characterized in that the valve can be brought into its position of rest by the actuating pressure for the coupling device.

13. A hydrodynamic retarder according to claim 9, wherein the pressure in front of the common overflow valve is supplied via a line from said control valve as a measuring pressure.

* * * * *